March 27, 1962 R. W. HAMILTON 3,026,983
AUTOMATIC PARKING METER
Filed March 30, 1953 6 Sheets-Sheet 1

FIG. 1

INVENTOR.
R. W. Hamilton
BY
ATTORNEY

FIG. 2

March 27, 1962 R. W. HAMILTON 3,026,983
AUTOMATIC PARKING METER
Filed March 30, 1953 6 Sheets-Sheet 3

INVENTOR.
R. W. Hamilton
BY
ATTORNEY

March 27, 1962 R. W. HAMILTON 3,026,983
AUTOMATIC PARKING METER

Filed March 30, 1953 6 Sheets-Sheet 4

FIG. 5

*INVENTOR.*
*R. W. Hamilton*
BY
*ATTORNEY*

March 27, 1962  R. W. HAMILTON  3,026,983
AUTOMATIC PARKING METER
Filed March 30, 1953  6 Sheets-Sheet 5

INVENTOR.
R. W. Hamilton
BY
ATTORNEY

United States Patent Office 3,026,983
Patented Mar. 27, 1962

3,026,983
AUTOMATIC PARKING METER
Robert W. Hamilton, Oklahoma City, Okla., assignor to Magee-Hale Park-O-Meter Company, Oklahoma City, Okla., a corporation of Delaware
Filed Mar. 30, 1953, Ser. No. 345,571
7 Claims. (Cl. 194—72)

This invention relates to an automatic parking meter for indicating parking time on city streets, parking lots, or packing spaces and the like, and more particularly, but not by way of limitation, to an automatic parking meter which is operable by one or more denominations of coins and which will operate by multiple coins of each of a selected or variable denomination, in a manner to accumulate the time by a subsequent insertion of a coin during the operation of a meter that already shows time indicated thereon.

This application is an improvement over the prior United States of America patents of G. A. Hale, No. 2,532,906 issued December 5, 1950, and No. 2,625,250 issued January 13, 1953, respectively.

A parking meter operates in all weather conditions, and a great number of present day parking meters depend on gravity to drop the coin through a coin chute in order to operate at least certain phases of the meter operation. It becomes apparent that any gravity operation is subject to weather conditions, such as infiltrated moisture, freezing rain, dust, and the like having a detrimental effect on the operation of the meter. Furthermore, there are many present day meters utilizing a multiple coin operation wherein the coins may be of variable denominations, such as a penny and nickel, such as the prior patents to Hale above mentioned.

The present invention broadly is concerned with an automatic parking meter which starts its operation through a coin tripping a latch when inserted into the machine by the operator's finger. The machine may be selectively operated by a plurality of variable-sized coins or coins of numerous denominations, as well as multiple coins of each of the sizes or denominations. The indicating time is set by a predetermined stop mechanism operating with a coin setting lever wherein the time indicator is released from a driving connection with a clock train to be allowed to return to a starting or time indicating position under the energy of a spring. The time indicating position is regulated by the stop mechanism in accordance with the size or denomination of the coin or coins. The time indicator after being set is moved in one direction with the clock-driven connection gear train to show utilization of the selected time.

It is an important object of this invention to provide an automatic parking meter which is operable on a plurality of coins of variable sizes, or denominations, as well as multiple coins of each size or denomination.

It is a further object of this invention to provide an automatic parking meter which can be infinitely adjusted for operation with various combinations of coins of variable sizes or denomination, and a multiple of such variable coins to provide any desired length of parking time complementary to the value of the coins or the multiple coins utilized.

A further object of this invention is to provide a fully automatic parking meter which is operable on at least four coins of variable sizes and denominations.

Still another object of this invention is to provide a parking meter which may be adjustable to provide for any desired length of parking time through insertion of a multiple of variable sized coins or coins of variable denominations, although there may not be a sequential relationship between the value of the coin and its physical size in comparison to other coins in the operating series.

And still another object of this invention is to provide an automatic parking meter which is operable on two or more coins or multiples of coins of variable sizes or denominations giving full indicating time in complement to the value of the coin upon insertion.

A further object of this invention is to provide a parking mechanism whereby the coin is inserted into the meter by operator's finger to cause actuation of a power driven coin propelling element which picks up the coin and moves a predetermined distance dependent upon the size of the coin in order to operate an indicator stop unit for re-setting the time indicator complementary to the value of the coin inserted.

An additional object of this invention is to provide an automatic parking meter wherein insertion of a coin under the force of the operator's finger moves a coin trip lever which in turn only serves to release a power driven coin propelling element of the mechanism thereby eliminating the use of the weight of the coin for tripping the mechanism into operation thereby producing a tripping action which is more positive, simple and durable.

An additional object of this invention is to provide an automatic parking meter which has a power driven element released through insertion of the coin into the mechanism which operates to re-set a time indicator in complement to the value of the coin and will also display the coin to decrease the possibility of utilizing slugs in the mechanism.

And still another object if this invention is to provide an automatic parking mechanism wherein the mechanism for re-setting the time indicator is released to operate, and not forcibly moved through a fixed distance.

And still another object of this invention is to provide an automatic parking mechanism which allows immediate re-setting of a time indicator upon the successive insertion of multiple coins of like or different denominations and which is adjustable to provide for numerous combinations of each denomination of coin.

And still another object of this invention is to provide an automatic parking meter having a time indicator re-setting mechanism for moving the time indicator from one position to another relative to the time scale, and which will cumulate the time upon each re-setting of the time indicator irrespective of the starting position of the indicator.

And a further object of this invention is to provide a selective coin automatic parking meter adapted for cumulating time in the time indicating mechanism in accordance with the size or denomination of coin utilized, and wherein the meter is automatic and more durable in its operation, simple in construction, and facilitates the maintenance and any adjustment thereof.

Other objects and advantages of the invention will be evident from the following detailed description, read in conjunction with the accompanying drawings, which illustrate my invention.

Figure 1:
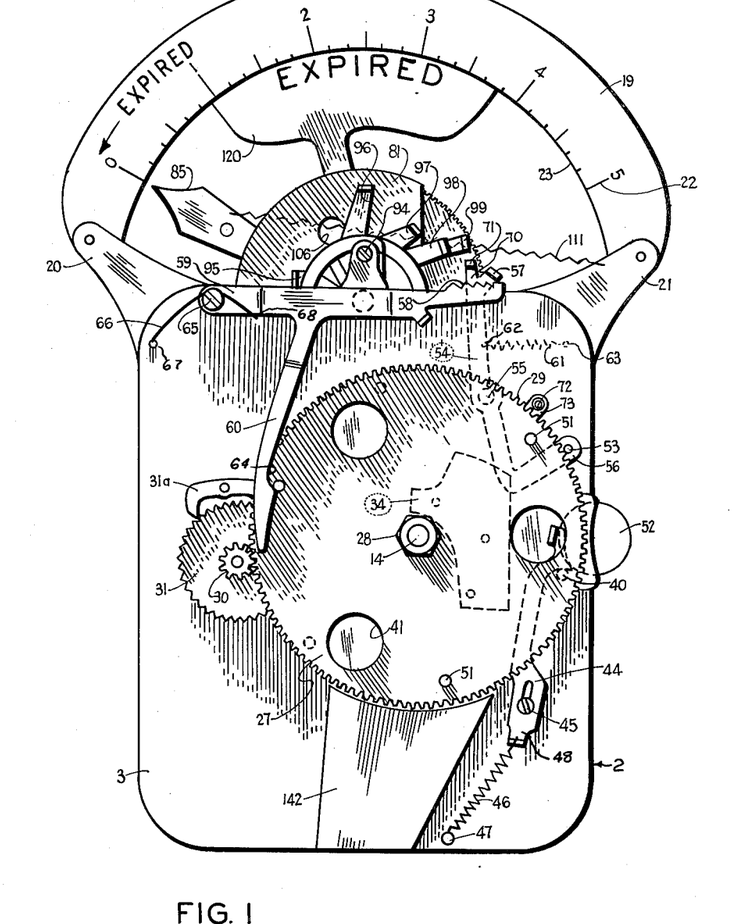
FIG. 1 is a diagrammatic front elevational view of the mechanism of the parking meter mechanism with certain parts broken away, and showing the elements in normal position before insertion of a coin.
Figure 2:
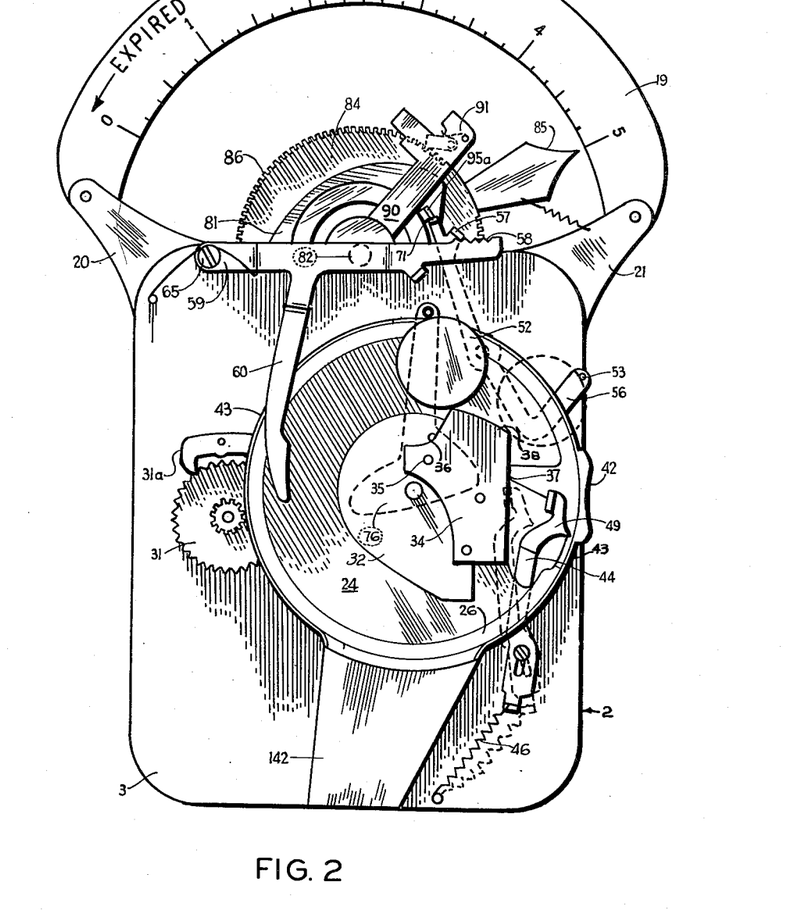
FIG. 2 is a similar view with the coin rotator plate removed for clarity to show operation of the coin for setting the stop pawl setting mechanism.
Figure 5:
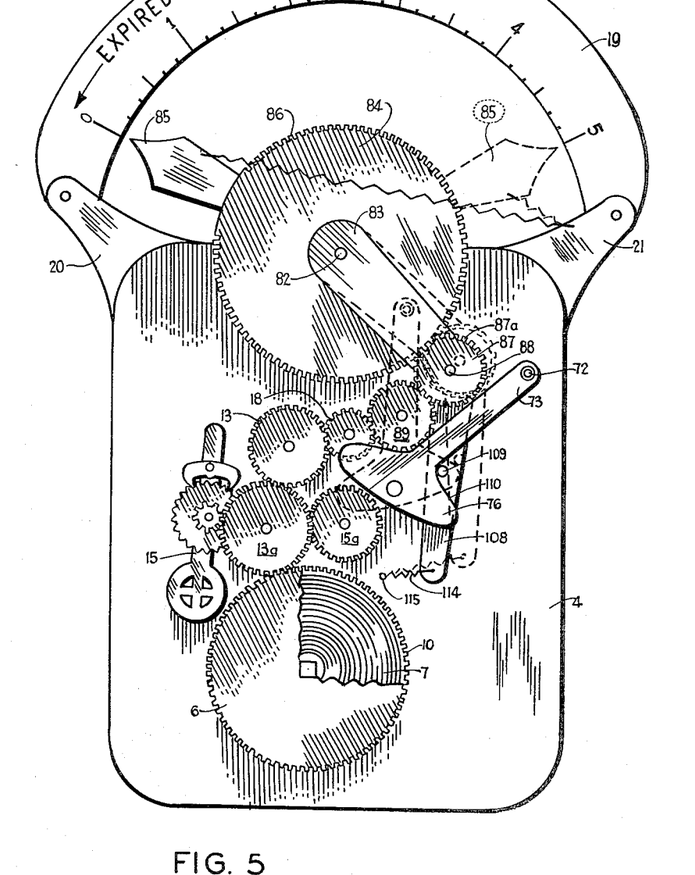
FIG. 5 is a diagrammatic front elevational view of the clutch releasing means for the time indicator and its connecting gear train with the clock mechanism and also discloses a modified form showing an alternate disposition of the timer gear.
Figures 8, 9:
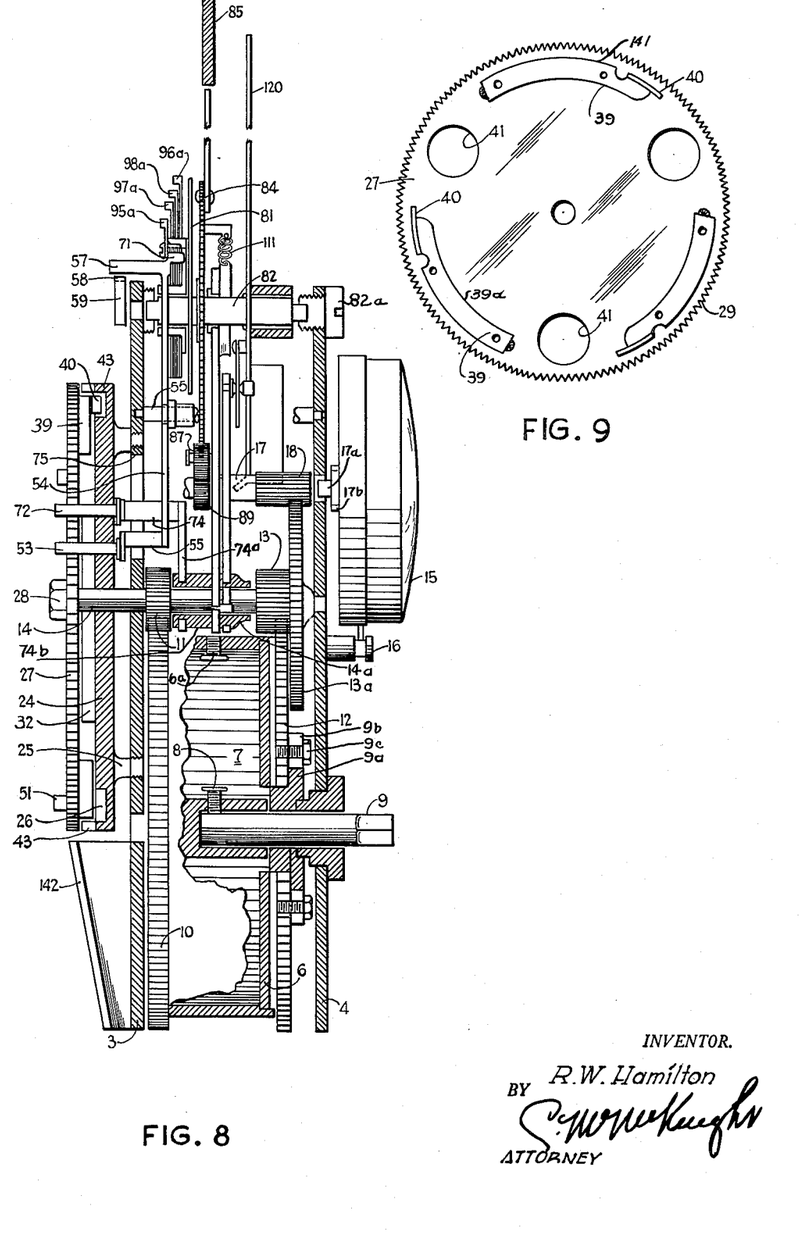
FIG. 8 is a side elevational view mainly in section taken from the right of FIG. 1, and with certain parts omitted for clarity.
FIG. 9 is an elevational view of the rear face of the rotator plate.

Referring to the drawings in detail, and more particularly to FIGS. 1, 2, and 5, reference character 2 designates a parking meter mechanism adapted to be encased as a unit in a suitable housing (not shown). The case or housing forms no part of the present invention. The mechanism 2 comprises a pair of spaced plates wherein the front plate 3, FIG. 8, in conjunction with the rear plate 4, provide an outer framework for the parking meter mechanism. Referring to FIGS. 5 and 8, a main spring housing 6 is disposed in any suitable manner between the plates 3 and 4 and encloses a main spring 7 suitably anchored at one end by a set screw 8 to a shaft 9. The shaft 9 is disposed in any suitable manner at opposite ends (not shown) in the plates 3 and 4 respectively. The rear end of the shaft 9 extends outwardly from the back plate 4 and is provided with a square end suitable to receive any winding key to cause rotation of the shaft and thereby wind the main spring 7 when desired. The shaft 9 is free to rotate in its mounting by any winding of the spring, and is provided with a ratchet member 9a fixed to the shaft 9 in any suitable manner at a position adjacent one side of the barrel housing 6. The ratchet 9a cooperates with a set of pawls 9b, only one of which is shown, secured to the large gear 12 by suitable studs 9c.

The circular outer edge of the front plate of the housing 6 is provided with a plurality of gear teeth 10 adapted to engage with a connecting gear member 11 forming part of a gear train for a purpose as will be hereinafter set forth. The main gear 12 is rotatably carried by the ratchet member 9a and as will be noted in FIG. 8 is slightly spaced from housing 6. The gear 12 is in engagement with a freely rotatable compound pinion and gear 13 mounted on main drive shaft 14 disposed between the frame plates 3 and 4. The shaft 14 is normally rotatable between the plates 3 and 4 and carries the fixed gear member 11 therewith. The pinion 13 is mounted on the shaft 14 but freely rotatable thereon. As will be noted in FIG. 8, one end of the main spring 7 is anchored to the shaft 9 through the set screw 8, while the opposite end is anchored to the barrel 6 through the set screw 6a as shown. It will be apparent that the spring barrel drives pinion 11 and shaft 14 through large gear 10, whereas compound gear 13 is driven by large gear 12 and is in turn driven by the other end of the spring 7 through set screw 8, shaft 9, and ratchet 9a. A suitable timer or clock works 15 is secured by locking studs 16 to the rear plate 4. A clock shaft 17 extends from the clock mechanism 15 and is disposed between the plates 3 and 4. The shaft 17 is shown in FIG. 8 as broken for purposes of clarity. The shaft 17 is provided with a pinion 18 adapted to mesh with the compound gear 13, thereby providing a connection for driving the clock works 15 from the main spring 7 as has been stated above. It is preferable to connect the shaft 17 with the clock mechanism by a suitable shaft 17a of reduced size and of substantially square or odd shaped configuration adapted to be disposed in complementary aligned recesses (not shown) in the shaft 17 and the bearing 17b of the clock mechanism 15 to assure the driving connection therebetween. In FIG. 8 portions of the connecting shaft 17a have been omitted for purposes of clarity.

Referring to FIGS. 1 and 2, a dial member 19 of substantially curved configuration is disposed above the plates 3 and 4 by extension flanges 20 and 21 adapted to be secured in any suitable manner (not shown) at opposite sides of the plates 3 and 4. Both the front and rear faces of the dial 19 are scaled, as at 22, to show a total of five hours' time divided into approximately ten minute intervals. The dial is provided with a cutaway or apertured portion 23 for convenience and lightness.

The main shaft 14 extends through the front plate 3 and on its outer end, is adapted to receive a circular coin pan 24 fixed to the front plate 3 in any suitable manner, preferably by stud members 25, FIG. 8. As shown in FIG. 8, the coin pan is provided with a circular recessed portion 26 for a purpose as will be hereinafter set forth. On the extreme outer end of the shaft 14 there is provided a coin propelling plate or rotator 27 disposed in horizontal spaced relation to the coin pan 24. It is apparent that the pan 24 is also slightly spaced forward of the front plate 3. The coin rotator plate 27 is secured to the shaft 14 by a suitable nut 28. The gear 10 is freely rotatable about the shaft 9 due to its connection with the main spring 7 at 6a, and meshes with the pinion 11 mounted on the shaft 14 to provide a driving connection for the coin rotator plate 27 from the energy of the main spring 7. The outer circumferential periphery of the rotator plate 27 is provided with a plurality of gear teeth 29, FIG. 1, adapted to mesh with a gear 30 of a speed limiting device, comprising a star wheel type unit 31 and pivotal detent 31a, for regulating the speed in a manner as will be hereinafter set forth.

From the foregoing it will be apparent that the main spring 7 provides a source of energy for both the clock works and the coin rotating plate, the function of which will be hereinafter set forth. The front face of the coin pan 24 is provided with a raised boss portion 32 (FIG. 8) having a cutaway portion (not shown) for the reception of a cam member 34, FIGS. 1 and 2. The cam portion 34 is fixed to the plate 24 by suitable screws 35, and is provided with a substantially vertical straight face 37 communicating with a slightly curved, or arcuate, face 38 leading off at a slight angle therefrom. The end of the face 38 communicates with a recess 36 extending downwardly from the end of the face 38, thereby providing an irregular-shaped cam member for a purpose as will be hereinafter set forth. The back face of the coin rotator plate 27 is provided with a plurality (preferably three, but not limited thereto) of circumferentially spaced coin catch members 39, each having a hook or pin 40 provided at one end, FIGS. 8 and 9. The outer end of the pin 40 is preferably curved or circular in shape as shown in FIG. 1. However, it is not limited to this particular configuration. Also, a plurality of spaced apertures 41 acting as coin display windows are provided in the rotator plate 27 for a purpose as will be hereinafter set forth. A slot portion 42 is provided between the rotator plate 27 and the coin pan 24, acting as a coin slot for receiving the coins.

The coin pan is provided with a circumferential rim, or outwardly extending flange 43, in order to maintain the coins between the rotator plate 27 and the pan 24 for a purpose as will be hereinafter set forth. This rim extends substantially through a greater portion of the circumference of the coin pan 24, however, portions are omitted therefrom in proximity of the trip lever 44 and coin shoot 142. A coin trip lever 44, shown partly in dotted lines, FIG. 1, is pivotably mounted on the front plate 3 by a pin 45. A helical spring 46 is anchored at one end to a stud 47 secured on the plate 3. The opposite end of the spring 46 is anchored to the lower flange portion 48 of the lever 44, normally tending to rotate the pivotable lever 44 in a clockwise direction. The lever 44 is provided with an outwardly extending projection or stud 49 adapted to contact one of the pins 40 (shown in dotted lines for clarity) provided on the inner face of the rotator plate 27.

As is shown in FIG. 1, the front face of the rotator plate 27 is provided with a plurality (preferably three) of pins or studs 51, preferably spaced 120 degrees apart on the plate 27, but not limited thereto. These pins act as release pins for a purpose as will be hereinafter set forth. In similar manner on the back face of the coin rotator plate 27 the three stop pins 40 are also spaced 120 degrees apart in the present structure, but not limited thereto. Each of the stop pins 40 is provided at one end of the coin carrying segments secured to the back face of the plate 27, as shown in FIG. 9, and are preferably disposed on the plate in about a media angular position between the release pins 51 disposed on the front face of plate 27, although not limited thereto. The spacing of pins 40 and 51 may be variable, but in the present instance insures that at least three coins of any diameter will be carried through one complete cycle of revolution, or 360 degrees, of the rotator plate 27 in a manner to be hereinafter described. The number of coins to be carried through the rotator plate in one revolution may be varied as desired. Furthermore, the number of display windows 41 conforms to the number of coins for one revolution, which in the present disclosure is three.

As the coin is moved through the slot 42 by the pressure of the operator's finger, the coin trip lever 44 is pivoted (dotted lines, FIG. 2) in a counter-clockwise direction, thereby moving the flange 49 out of contact with a stop pin 40 permitting rotation of the plate 27 in a counter-clockwise direction (FIG. 1) under action of the spring 7. As the rotator plate 27 is propelled counter-clockwise, the leading edge of catch member 39 engages the circumference of the inserted coin 52, which when inserted through slot 42 will be in engagement with the face 37 of the cam member 34, whereby the coin is propelled simultaneously with the plate 27 at a constant speed as determined by the speed limiting device 31. The member 39 moves the coin 52 along the cam face 37 until it is subsequently brought into contact with a pin 53 of a coin pre-setting lever 54 which is pivotably secured to the plate 3 by a stud shaft 55. From FIGS. 1 and 8 it will be apparent that the coin pre-set lever 54 is in the form of a bell crank having a lower bent portion 56, and the main leg portion 54 extending vertically upwardly and in spaced relation from the rear face of the front plate 3. The uppermost end portion is yoke shaped and provides for an outwardly extending flange or pawl 57 adapted to engage in one of the plurality of ratchet teeth 58 provided on the normally horizontally disposed leg 59 of a bell crank lever 60 for purposes as will now be explained.

It will be appreciated that as soon as the coin 52 has moved out of the path of holding flange 49 on the trip lever 44, the spring 46 pivots the lever 44 clockwise and to its original position so as to be disposed in the path of the next oncoming pin 40 disposed on the inner-face of the rotator plate 27. During rotation of the plate 27, the flange 49a rides on the inner periphery 39a (FIG. 9) of the catchers until it drops off the end thereof to be brought into position for contact with the next oncoming pin. However, as previously stated, the spacing between the pins 40 is sufficient to provide for complete actuation of the time setting mechanism of the meter through the movement of a coin 52 as will be subsequently explained. It will be apparent that the inner periphery 39a of the catchers 39 are spaced radially inward a slight distance from that of the pins 40 and further that the flange 49 as previously stated projects outwardly from the leg 44, thereby disposing the leg 44 inwardly of the catchers 39 and pins 40 to permit rotation with the plate 27 for engagement of the flange 49 and the next oncoming pin 40.

A helical spring 61 is anchored at one end 62 to the pre-set lever 54, and at its opposite end to a stud 63 secured to the front plate 3. The spring 61 normally urges the lever 54 in a clockwise direction, and movement of the lever counter-clockwise by contact of the coin 52 with the stud 53 is against the action of the spring 61. Before the circumferential edge of the coin passes from contact with the pin 53 on the lever 54, a pin 51 fixed on the outer face of the rotator plate 27 (FIGS. 1 and 8) has been moved into contact with an arcuate surface 64 provided on the lowermost portion of the bell crank lever 60. The bell crank lever 60 is freely pivotable on a stud 65 mounted in plate 3 and normally held against a pin 51 by action of the torsion spring 66 disposed around the stud 65. The spring 66 is anchored at 67 to the plate 3 and at 68 to the underface of the leg 59 of the bell crank lever 60. The torsion spring 66 normally urges the leg 59 in a counter-clockwise direction, and when the pin 51 is moved beneath the arcuate surface 64, the bell crank lever 60 is then permitted to pivot about the stud 65 to bring one of the notches 58 into contact with the pawl 57.

The pawl 57 forms one leg of the yoke end of the pre-set lever 54 while a second leg 70 forms the other portion of the yoke, and the leg 70 is provided with an inwardly extending flange or stud 71. The stud 71 extends inwardly from the leg 70 in a direction slightly at an angle to that of the pawl 57, as is shown in FIG. 2, and for a purpose as will be hereinafter set forth. The pre-set lever 54 and its pawl 57 are pivoted in an amount complementary to the diameter or size of the coin 52 being moved by the rotator plate. The pivotable movement in a counter-clockwise direction of the pre-set lever 54 is obviously of a short stroke, because when the coin 52 contacts the pin 53, it will move the lower leg 56 slightly upward causing pivoting of the lever 54 to move the pawls 57 and 71 in a left-hand direction according to FIG. 2. As the coin slips out from under the pin 53, the lever 54 and the pawl 57 is caught by the action of the spring 61 in one of the pre-determined notches 58 having been simultaneously moved into position through pivoting of the released bell crank 60. With engagement of the pawl 57 in a pre-determined notch 58, the stop pawl 71 is placed in a position as determined by the diameter of the coin to subsequently engage one of a plurality of stop pawls rotating during the indexing operation in a manner as will be hereinafter set forth. It will be apparent that one notch 58 is required for each coin, and each size of coin to be used, as will be hereinafter explained. The lever 54 through the pawl 57 is held in engagement with the selected notch 58 until the operation of setting the time indicator is completed, and the indexing mechanism except rotator plate 27 has returned to starting position.

Figure 3:
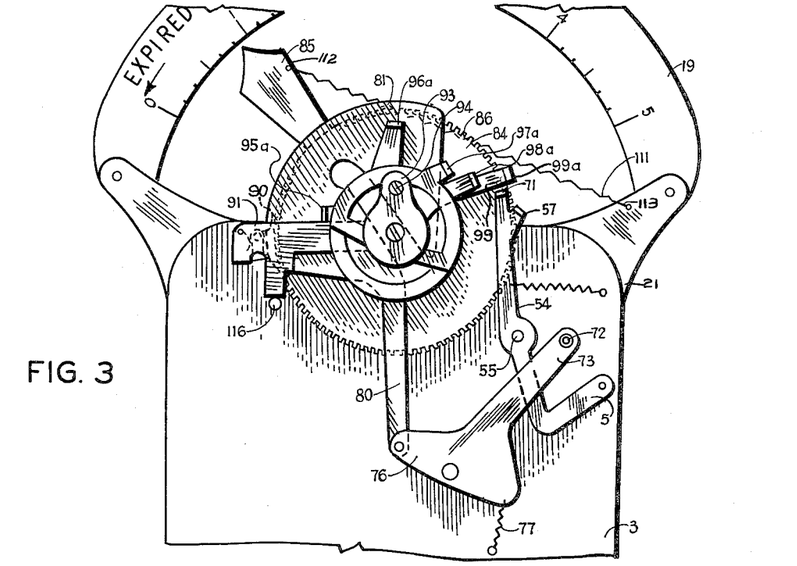
FIG. 3 is a diagrammatic detail view in front elevation of the indicator re-set mechanism with certain parts omitted for clarity, and showing the stop mechanism for the accumulative indexing.

As soon as the coin passes from contact with the pin 53, continued movement by the leading edge 39 over the slightly arcuate surface 38 of the cam 34 brings the coin into contact with the outwardly depending pin 72 of a coin re-set lever 73, FIGS. 1, 2, 3. The coin re-set lever 73 is loosely mounted on the main shaft 14 (FIG. 8), and its main leg portion is disposed immediately behind the front plate 3. The pin 72 and lever 73 are connected to one end of a stud 74 disposed through an aperture 75 of the front plate 3 and connected at its opposite end with a carrier plate 74a so that the pin 72 is projected outwardly from the front of the rotator plate 27, at a point conterminous with the circumference of the coin pan 24 and plate 27, as shown in FIG. 1. The carrier plate 74a is fixed to a bearing 74b rotatably disposed on the shaft 14. The re-set lever 73 in rest position is normally disposed in the angular position, as that clearly shown in FIG. 3. The re-set lever 73 is provided with a cam portion 76 for a purpose as will be hereinafter set forth. A helical spring 77 is anchored at 78 to one side of the cam, while at the opposite side 79 is secured a leg 80 of a leaf cam 81 for a purpose as will be hereinafter set forth. The spring 77 is anchored at its opposite end to a stud 78a secured in the rear face of the front plate 3. Prior to describing the operation of the re-set lever 73, the explanation of the indicator segment and the indexing mechanism cooperating therewith shall be set forth.

A freely rotatable shaft 82 is disposed in the upper portion of the mechanism 2 between the plates 3 and 4, FIG. 8. The shaft 82 is loosely mounted in bearings 82a and an idler lever 83 is fixed on the shaft 82. A time indicator disc 84 is loosely mounted on the shaft 82 conterminous and parallel with the lever 83. The disc 84 is provided with an indicator pointer 85 cooperating with the dial 19 in the usual manner. A substantial portion of the circumferential periphery of the disc 84 is provided with a plurality of gear teeth 86 for a purpose as will be hereinafter set forth.

A freely rotatable idler gear 87 is secured to the idler lever 83 by a suitable stud member 88, and the gear 87 has peripheral teeth 87a constantly meshing with the disc teeth 86. The gear 87 also meshes with a gear 89 rigidly disposed on the clock shaft 17. The gear 89 is driven through the shaft 17, pinion 18, compound gear 13 and gear 12 in a manner as has been heretofore referred to. The train of gears 18, 13 and 12 are time controlled through escapement mechanism 15.

Figure 4:
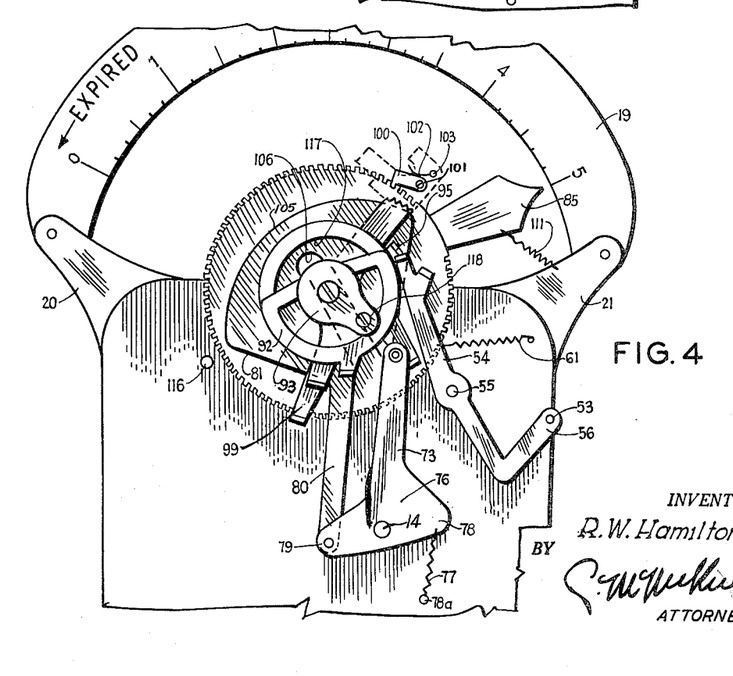
FIG. 4 is a view similiar to FIG. 3 with certain parts omitted for clarity showing another operating position of the indicator re-set mechanism.

As is clearly shown in FIGS. 3, 4, and 8, a stop indexing mechanism is freely secured to the shaft 82 at a point adjacent one side of the indicator disc 84. The indexing mechanism comprises in part a member 90 freely rotatable on shaft 82 and having a perpendicular extension 91. A plurality of apertured circular disc members 92 (preferably five but not limited thereto) are also secured on the shaft immediately adjacent the member 90, and are secured therewith by a front disc or washer 93 and an adjustable threaded stud 94. Each disc 92 is provided with a depending leg portion 95, 96, 97, 98 and 99 and arranged in angularly spaced relation to each other for a purpose as will be hereinafter set forth. The outer end of each of the legs 95 to 99, inclusive, is provided with an outwardly depending perpendicular flange member or pawl 95a to 99a, respectively, for selectively contacting the stop pawl 71 in a manner to be hereinafter set forth. Each stop leg and its respective pawl member are adjustably set at a pre-determined position in complement to the size of a particular coin of the plurality of coins that may be used in the meter. For example, leg 95 is set in complement to a coin of the largest diameter, where leg 96 is set corresponding to a coin of the smallest diameter, while legs 97 and 98 are set to correspond to coins of different in between diameters, and the stop leg 99 represents a zero time position of the indicator 85, all of which will be subsequently explained.

The outer end of the leg member 90 is provided with a pawl member 100 pivotably secured to a stud 101 provided in the leg 90. The pawl 100 is urged in a counter-clockwise direction, according to FIGS. 1, 3, and 4, by a leaf spring 102 anchored around a stud 103 provided on the leg member 90. The pawl 100 is adapted to engage with the ratchet teeth 86 of the disc 84 to index the time in accordance with the size of the coin used, as will be subsequently set forth. The pawl 100 is maintained in disengagement with the ratchet teeth 86 by the outer arcuate periphery 105 of the leaf cam 81. From FIG. 1 is will be apparent that the leaf cam is substantially of a "morning glory" configuration wherein the main body portion substantially depicts a quarter segment of a circle having a recess or groove 106 adapted to be disposed around the shaft 82, FIG. 4. The leaf cam 81 is moved upon actuation of the coin re-set lever 73, as will now be set forth.

After the pre-setting lever 54 has been actuated to place the stop pawl 57 in a predetermined notch 58, dependent upon the size of the coin inserted, the coin is subsequently passed from underneath the pin 53 and engages the pin 72 of the re-set lever, thereby moving the freely rotatable re-set lever in a counter-clockwise direction, as shown by the dotted lines in FIG. 2 and the full lines in FIG. 4. The rest position of the re-set lever 73 is at a substantially 45 degree angle, such as shown in FIG. 3. The idler lever 83 is provided with an extension leg 108, having a pin 109 disposed about media thereof. The outwardly depending pin 109 is adapted to engage the cam surface 110 of the cam portion 76 of the re-set lever 73. It will be apparent that in rest position of the re-set lever 73, the idler gear 87 is engaged with the driving pinion 89. At the start of the counter-clockwise movement of the lever 73, the leg 80 and leaf cam 81 are moved instantly downward, thereby releasing the pawl 100 for engagement with the teeth 86, and almost immediately the cam 76 moves the pin 109 and idler gear 87 away from gear 89. Engagement of the pawl 100 with the teeth 86 rotates the leg member 90 simultaneously with the indicator disc 84 under action of the re-set spring 111.

The re-set spring 111 for rotating the released disc 84 is anchored at one end to a stud 112 provided on the disc 84, and at its opposite end to a stud 113 provided on the flange 21. The rotation of the loosely mounted disc 84 around shaft 82 is in a clockwise direction for setting the indicator pointer 85 to a predetermined position on the dial 19. The time position has been previously determined by the disposition of the stop pawl 71 in complement to the size of the coin, for limiting the simultaneous clockwise rotation of one of the leg members 95 to 98 in a manner as will be hereinafter set forth.

In FIGS. 3, 4, and 5, it will thus be seen that the first few degrees of angular movement of the re-set lever 73 pulls the leaf cam 81 away from the pawl 100 to permit engagement of the pawl with the indicator teeth 86, and a release of the idler gear 87 to provide for rotation of the lever 91 in a clockwise direction simultaneous with the indicator gear 84 and indexing legs 95 to 98 until one of the angularly disposed stop pawls 95a to 98a strikes the projecting pawl 71 of the pre-set lever 54 to stop the indicator gear 84 and pointer 85 and thus indicate the predetermined period of time on the dial complementary to the size, or denomination of the coin inserted. As previously set forth, one of the stop pawls 95a to 98a shall be used for each size, or denomination of coin inserted in the meter, and each of the stop pawls shall have a predetermined length and adjustable in angular disposition in order to individually contact the projected stop pawl 71 of the pre-set lever 54 when the pawl 71 is being held in a selected position in the ratchet 58 by action of the coin as previously explained.

Continued movement of the re-set lever 73 after the indexing operation to set the predetermined time permits the member 39 to move the coin off the cam surface 38 to drop into recess 36 to be disposed adjacent a window 41 until a subsequent coin is inserted. This latter operation does not affect the indexing assembly until the re-set lever 73 is permitted to return to its starting position. Return of the re-set lever 73 to a starting position is provided by the spring 77 anchored at 78 to the cam portion 76 and to the front plate 3 at 78a. As soon as the coin has been moved into the cam groove 36, the re-set lever 73 is released and permitted to return to reset position under action of the spring 77. During the return stroke of the re-set lever 73, the cam portion 76 is rotated clockwise, thereby moving leg 80 and leaf cam 81 upwardly to disengage the pawl 100 from the gear teeth 86, thereby permitting the index lever 91 to return to its starting position under action of any suitable spring (not shown). Return of lever 73 also moves cam 76 away from pin 109 to engage gear 87 with gear 89 under action of spring 114 anchored at one end to lever 108 and at its opposite end to pin 115.

It will thus be seen that the indicator 84 after having been released to move in one direction and set in a pre-determined position relative to the scale 19 is caused to rotate about the shaft 82 in an opposite direction at a predetermined rate by the engagement of the teeth 86 with the idler gear 87. The gear 87 will remain in engagement with pinion 89 until actuation of the re-set lever 73 and its attendant cam portion 76 against pin 109 to disengage the idler gear 87 as has been previously explained.

Multiple Coin Operation

The denomination of most disc-like coins used by any country is usually dependent upon variations in size, and the meter mechanism disclosed is adaptable for variable sizes of coin merely by adjustment of the angular position of the indexing stop legs 95 to 99, respectively. The dial 19 is preferably set from one to five hours, but may be varied as desired; in the present disclosure the stop legs are adjusted for use with a plurality of coins of the United States of America from one cent to twenty-five cents, wherein the stop 95 represents the twenty-five cent or quarter coin, stop 96 represents the ten cent or dime coin, stop 97 represents the five cent or nickel coin, stop leg 98 represents the one cent or penny coin, and stop leg 99 does not represent any coin, but a zero position of the indicator.

With insertion of a coin into the mechanism, the coin lever 44 is tripped to start rotation of the plate 27, thereby moving the inserted coin into contact with the pin 53 for pivoting the lever 54 into a predetermined position respecting the pivoted bell crank 60 and the ratchet teeth 58. The first ratchet tooth 58, starting from the left on leg 59 (FIG. 1), upon engagement by pawl 57 will position the stop pawl 71 in the path of the stop pawl 95a for the twenty-five cent or quarter coin. The second ratchet tooth 58 positions the pawl 71 respecting the five cent or nickel coin, the third ratchet tooth respecting the one cent or penny coin, while the fourth ratchet tooth 58 positions the pawl 71 in complement to the ten cent or dime coin. It will thus be seen that movement of the lever 54 through contact of the coin with the pin 53 is determined by the diametrical width of the coin. In U.S. coins (although the mechanism is not limited to use with U.S. coins, but may be used with coins of any nation) the quarter being the largest in diametric width used in the present disclosure pivots the lever 54 counter-clockwise to a greater degree, while the dime coin pivots it to the smallest degree. The disposition of the cam 34 and the cam surface 38 respecting the positioning of the pin 53 has been calibrated to provide this predetermined pivotal movement of the lever 54 in complement to the pivotal movement of the released bell crank 60 and ratchet teeth 58 to assure that the pawl 71 is maintained in a selected predetermined position for stopping one of the indexing legs in complement to the size of the coin.

Following the initial setting of the pawl 71, the re-set lever 73 releases the disc 84 and the leaf cam 81 to cause engagement of the indexing lever 91 with the disc 84 for simultaneous rotation therewith under action of spring 111. Rotation of the indexing lever 91 provides simultaneous rotation of the plurality of indexing legs 95 to 99, and a positioning of the pointer 85 respecting the dial 19 to show a predetermined amount of time. The angular position of each of the indexing legs is in relation to the released movement of the disc 84 for setting a predetermined amount of time in accordance with the size and denomination of the coin inserted. The positioning of the indexing legs 95 to 98 in the present mechanism has been made for increments of twelve minutes of time for a one cent coin, and is increased accordingly for the coins of larger denomination. Consequently, up insertion of a quarter or twenty-five cent coin, the pawl 57 is moved into the first ratchet tooth 58, thereby placing the pawl 71 out of the path of any of the closer positioned indexing legs, but directly in the path of the farthest positioned indexing leg 95, so that the disc 84 and pointer 85 will rotate under action of spring 111 until the indexing pawl 95a contacts the stop pawl 71 which positions the pointer 85 at the five-hour point.

In like manner it will be seen that coins of lesser denomination and lesser size may be inserted to selectively dispose the pawl 71 in the path of any one of the multiple legs 95 to 98 for stopping clockwise rotation of the disc 84 and leg 91, and thus positioning the pointer 85 for indicating a period of time depending upon the size or denomination of the coin.

An insertion of a one cent coin will move the indexing leg 98 and corresponding pawl 98a an increment of twelve minutes before it is stopped by the pre-positioned pawl 71. In similar manner the leg 97 functions for the insertion of the five cent coin, and leg 96 functions for the insertion of a ten cent coin. The longest leg 99 is adapted to contact the pawl 71 when the lever 54 is at rest position, and not engaged in any of the ratchet teeth 58, and the pointer is at an expired position on the dial. Subsequent to the indexing operation, the return counter-clockwise movement of the indexing leg 91 under the action of the spring (not shown) is stopped by a stud 116 provided on the plate 4, FIG. 3.

It will thus be apparent that the mechanism provides for use for a plurality of different sized coins, and in the present instance four (but not limited thereto) coins of variable size or denomination for indicating variable periods of time on the dial 19. The plurality of coins used may be of the same size, or variable in size, thus providing a successive insertion of coins of the same or variable size.

The actuation of leaf cam 81 and the engagement of the pawl 100 with the disc 84 provide for a full accumulation of time in accordance with the size or denomination of the coin inserted regardless of whether time has been left on the meter between the insertion of one coin, and insertion of a subsequent coin much in the same manner as the accumulative indexing operation set forth in the prior patent to G. A. Hale, No. 2,532,906.

Adjustment of Indexing Legs

A washer member 93 is interposed between (only front washer shown) each of the individual apertured discs carrying the stop indexing legs 95 to 98, inclusive, and mounted upon the shaft 82. While the indexing discs 92 have large cut-away portions 117, the washers 93 have a small aperture 118 (FIG. 4) for the reception of the adjusting stud 94, so that when it is desired to adjust one of the stop legs 95 to 98, inclusive, the inter-spaced washers 93 will preclude movement of the remaining stop indexing legs. When it is desired to change the increment of the time period by adjustment of the stop indexing legs, for example, from a twelve minute increment, as disclosed, to a twenty minute increment for one specified size or diametric width of coin, it is only necessary to position the pawl 57 in the respective ratchet tooth 58 for the chosen coin. In the penny, the pawl 57 is positioned in the third ratchet notch 58 starting from the left on the leg 59, and subsequently moving the indicator pointer and segment 84 from zero position up to the twenty minute increment. The adjusting screw 94 will have been loosened to permit movement of the leg 98 for angular re-positioning of the indexing leg 98 complementary to the new time period.

For an adjustment of a series of variable sized coins then loosen screw 94 and rotate all of the indexing stop legs to a point adjacent pawl 71, and arrange in a substantially adjacent parallel position to each other. In this position, the pawl 57 can be moved into a selected notch 58, and repeat the aforementioned adjustment for each leg until a respective index leg has changed its angular position relative to the period of time desired. This can be done for each index leg in complement to the size of the coin utilized, after which the nut 94 can be tightened to maintain the various index legs in their predetermined positions. The positioning of the pawl 57 by counter-clockwise pivotal movement of the pre-set lever 54 is determined by the distance between the cam face 36, and the pin 53 on the lever. Obviously, a coin of greater diametrical width placed between the cam face and the pin will cause a greater pivoting movement of the lever 54. The size of the cam 34 and its respective surfaces 36 and 37 can be calibrated in complement to any desired size of coin. In like manner, the position of the notches 58 can be calibrated in complement to the movement of the pre-set lever 54 and pawl 57 in response to coins of variable size and denomination.

*Operation of the Expired Flag*

Figure 6:
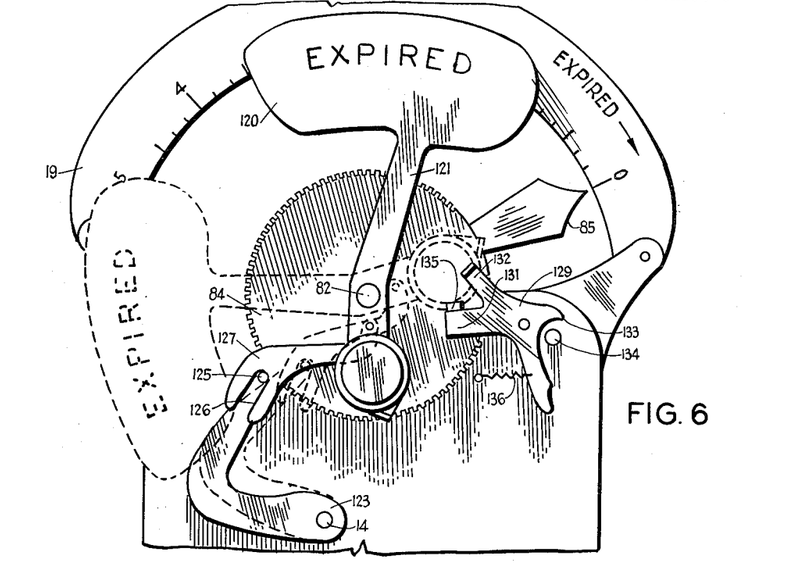
FIG. 6 is a view looking into the mechanism with the back plate and other parts omitted for clarity, showing one position of the expired flag signal.
Figure 7:
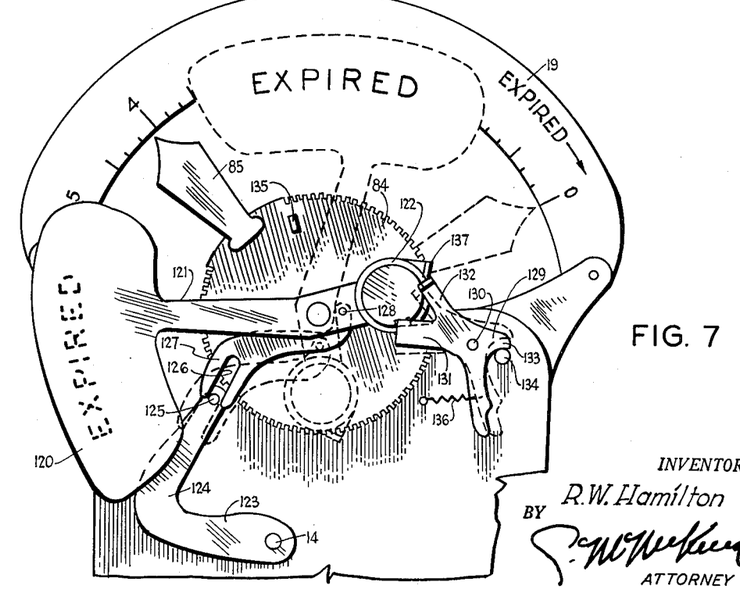
FIG. 7 is a similar view showing another position of the expired signal.

FIGS. 6 and 7 disclose the structure for the operation of the expired flag 120 which is carried on the indicator gear shaft 82. The flag has a depending leg 121 provided with a counter-balance 122. A bell crank 123 is rigidly mounted on a bearing 74b which is loosely mounted on the re-set lever shaft 14, and as shown in FIG. 7 is adapted to be moved in a clockwise direction upon operation of the re-set lever 73. The upper leg 124 of the crank 123 has a pin 125 normally disposed in a lost motion slot 126 carried by a link 127 pivotably mounted at 128 on the leg 121 of the expired flag or signal 120. This connecting link 127 is loosely mounted at 128 on the flag leg for operation with the pin 125 at all times.

A latch member 129 is provided on the opposite side of the mechanism and is freely pivoted at 130. The latch is provided with diverging legs providing stop members 131 and 132, respectively. The rear of the latch 129 is provided with a stop portion 133 cooperating with a pin 134 limiting movement of the latch in both directions. The lower stop 131 is held in a down position, as shown in FIG. 6, by a projecting pawl 135 carried on the inner face of the indicator disc 84. This down position is prevalent when the indicator pointer is at zero, or expired position. With the insertion of a coin and actuation of the re-set lever as previously set forth, there is a simultaneous movement of bell crank 123 clockwise, as shown in FIGS. 6 and 7, moving the pin 125 to the bottom of the lost motion slot 126, thereby providing a connection with the flag leg 121 through link 127, and causing rotation of the leg counter-clockwise, thereby moving the expired flag 120 from an up position, shown in dotted lines, FIG. 7, to a down position, shown in full lines. Simultaneous with movement of the re-set lever 73 and the bell crank 123, the time indicator 85 and disc 84 are moved counter-clockwise, thereby moving the stop pawl 135 away from the lower stop 131, and permitting rotation of the latch 129 under action of the spring 136 in a clockwise direction to place the stop 132 beneath a flanged lug 137 carried on the inner face of the counter-balance 122. The flag 120 is held in its down position by the latch 132 as long as there is unexpired time on the meter.

As soon as the pointer 85 and the disc 84 are moved in an opposite direction by the clock, and approach an expired zero time position, the lug 135 will contact the latch stop 131 and rotate the latch counter-clockwise against the action of the spring 136, for moving the latch stop 132 away from the lug 137, so that the counter-balance 122 will rotate the flag 120 into an up position for indicating an expired time condition. It will be apparent there is sufficient spacing between the disc 84 (FIG. 8) and the expired flag 120 to permit movement of the lug 135 (FIG. 7) into contact with the latch 129.

As shown in FIG. 9, the rear face of the rotator plate 27 is provided with a plurality of arcuately shaped coin carrying segments, or catchers 39, preferably three as shown, but not limited thereto. Each coin catcher has a pin 40 at one end, and during operation of a pin 40 with an inserted coin, the outer curved face 141 of the catcher 39 closes off the coin slot 42 to prevent insertion of another coin therein until complete actuation of the mechanism for one coin insertion. After one time setting a coin 52 is rotated behind in the rotator plate 27 in the display windows 41 until they are rotated into a position for dropping into the coin chute 142 for subsequent deposit in a suitable container (not shown).

In FIG. 5 is shown an alternate disposition of the timer gear designated as 15a. The positioning of the timer as shown at 15a will provide twice as much time as the disposition shown for 15.

From the foregoing, it will be apparent that the present invention contemplates a parking meter mechanism which is fully automatic in its operation and is capable for variable selective increments of time depending upon coins of variable size and denomination. In the present instance the machine has shown to be operated with coins of four different sizes and denominations, but it is not limited to any specific number of coins or sizes of coins. The indexing mechanism may be so constructed and arranged to provide for any number of different sizes of coins as is practical. The pre-set operation of the mechanism is such to insure that there is a positive and accurate selection of the time increment prior to any actuation of the indexing mechanism. In addition, the indexing mechanism may be infinitely adjustable to provide for any desired length of parking time on almost any combination of multiple coins of the same size or different sizes, and the coins are all inserted in the same coin slot for operation of the meter.

Furthermore, operation of the meter on a plurality of variable sized coins can be accomplished without any sequential relationship between the length of parking time given for any one coin of the series, or the value of the coin of the series, or the physical size of the coin of the series, and the meter may be adjusted for any desirable length of parking time in complement either to the size or denomination of the coin.

Changes may be made in the combination and arrangement of parts as heretofore set forth in the specification and shown in the drawings, it being understood that any modification in the precise embodiment of the invention may be within the scope of the following claims without departing from the spirit of the invention.

I claim:
1. In an automatic parking meter for receiving multiple coins of different sizes to selectively indicate variable periods of time, comprising an indicator disc movable relative to a time scale, a clock works for driving the indicator disc in one direction relative to the scale, means for moving the indicator disc in a direction opposite the first mentioned direction, an indexing mechanism for determining the selected time period having alternate engagement and disengagement with the indicator disc, a pre-set lever mechanism responsive to the size of inserted coin for movement to a predetermined position relative to the indexing mechanism, said pre-set mechanism comprising a bell crank lever having a pin movable by the inserted coin, a pivotable ratchet member released by a movement of the coin into the path of the bell crank lever, a stop member on the bell crank engaging the ratchet for limiting return movement of the pre-set lever and disposing it in a predetermined position relative to the indexing mechanism, a re-set means responsive to a subsequent movement of the inserted coin in the meter to provide for engagement of the indexing mechanism with the indicator disc and simultaneous rotation therewith in the last mentioned direction, and means in the indexing mechanism corresponding with the selected position of the pre-set lever stop member for contacting the stop member and limiting the rotation of the indexing mechanism to the selected time period.

2. In an automatic parking meter for receiving multiple coins of varying diameter and comprising an indicator disc segment movable relative to a time scale, a clock works for driving the indicator disc in one direction relative to the scale, spring means for moving the indicator disc in a direction opposite to the first mentioned direction, an indexing mechanism for determining a selected period of time having alternate engagement and disengagement with the indicator disc, a coin rotator, means responsive to insertion of a coin for tripping the rotator to permit rotation thereof, means for carrying the coin with the rotator, a pivotable pre-set lever responsive to the size of the inserted coin carried by the rotator for movement into a predetermined position relative to the indexing mechanism, said indexing mechanism comprising a plurality of levers each provided with an axially extending finger, said pre-set lever provided with an axially extending finger selectively engageable with the indexing fingers, said pre-set lever movable into more than two positions depending upon the size of the coin, said indexing levers adjustably positioned relative to the path of movement of the pre-set lever to provide movement of the indexing mechanism disproportionate to the size of the coin.

3. In an automatic parking meter for receiving multiple coins of variable denomination and size and comprising an indicator disc movable relative to a time scale, a clock works for driving the indicator in one direction relative to the scale, spring means for moving the indicator disc in a direction opposite to the first mentioned direction, an indexing mechanism for determining a selected period of time having alternate engagement and disengagement with the indicator disc, a coin rotator, means responsive to insertion of the coin for tripping the rotator to permit rotation thereof, means for carrying the coin with the rotator, a pivotable pre-set lever responsive to the size of the inserted coin carried by the rotator for movement into a predetermined position relative to the indexing mechanism, said indexing mechanism comprising a plurality of levers each provided with an axially extending finger, said pre-set lever provided with an axially extending finger selectively engageable with the indexing fingers, said pre-set lever movable into more than two positions depending upon the size of the coin, said indexing levers adjustably positioned relative to the path of movement of the pre-set lever to provide movement of the indexing mechanism disproportionate to the size of the coin.

4. In an automatic parking meter for receiving multiple coins of varying sizes and comprising an indicator segment movable relative to a time scale, a clock works for driving the indicator in one direction relative to the scale, spring means for moving the indicator in a direction opposite to the first mentioned direction, an indexing mechanism for determining a selected period of time having alternate engagement and disengagement with the indicator segment, a coin rotator, means responsive to insertion of the coin for tripping the rotator to permit rotation thereof, means for carrying the coin with the rotator, a pivotable bell crank lever responsive to the size of the inserted coin carried by the rotator for movement into a plurality of predetermined positions relative to the indexing mechanism, a pivotable ratchet member released by the coin rotator for positioning into the path of the bell crank lever, a stop member on the bell crank engaging the ratchet for limiting the return movement of the bell crank lever and disposing it in a predetermined position relative to the indexing mechanism, re-set means responsive to a subsequent movement of the coin with the rotator providing engagement of the indexing mechanism with the indicator for simultaneous rotation in the last mentioned direction, and means in the indexing mechanism corresponding with a selected position of the bell crank lever for contacting the stop member thereof to limit the rotation of the indexing mechanism to the selected time period.

5. In an automatic parking meter for receiving multiple coins and comprising an indicator disc movable relative to a time scale, a clock works for driving the indicator disc in one direction relative to the scale, spring means for moving the indicator disc in a direction opposite to the first mentioned direction, a cumulative indexing mechanism for determining a selected period of time having alternate engagement and disengagement with the indicator disc, a coin rotator, means responsive to insertion of the coin for tripping the rotator to permit rotation thereof, means for carrying the coin with the rotator, a pivotable pre-set lever responsive to the size of the inserted coin carried by the rotator for movement into at least three predetermined positions relative to the indexing mechanism, said indexing mechanism comprising a plurality of levers each provided with an axially extending finger, said pre-set lever provided with an axially extending finger selectively engageable with the indexing fingers, said pre-set lever movable into more than two positions depending upon the size of the coin, said indexing levers adjustably positioned relative to the path of movement of the pre-set lever to provide movement of the indexing mechanism disproportionate to the size of the coin, a cam member disposed parallel to the rotator and having a plurality of surfaces providing cooperation between inserted coins of variable sizes and the pre-set lever, means providing simultaneous rotation of the cumulative indexing mechanism and indicator disc in the last mentioned direction.

6. In an automatic parking meter for receiving multiple coins and comprising an indicator segment movable relative to a time scale, a clock works for driving the indicator in one direction relative to the scale, spring means for moving the indicator in a direction opposite to the first mentioned direction, a cumulative indexing mechanism for determining a selected period of time having alternate engagement and disengagement with the indicator segment, a coin rotator, means responsive to insertion of the coin for tripping the rotator to permit rotation thereof, means for carrying the coin with the rotator, a pivotable pre-set lever responsive to the size of the inserted coin carried by the rotator for movement into a plurality of variable predetermined positions relative to the indexing mechanism, a yoke member on the pre-set lever providing a stop member and an index pawl thereon, a cam member disposed adjacent the rotator and having a plurality of surfaces providing cooperation between inserted coins of variable sizes and the pre-set lever, said pre-set lever having a pin engaging the inserted coin for cooperation with the cam surfaces, a pivotable spring urged ratchet member having a plurality of notches provided thereon, means on the rotator and responsive to movement thereof for releasing the ratchet member to move one of the notches into contact with the stop member on the pre-set lever, each of said notches positioned on the ratchet member in correspondence to a particular size coin whereby said engagement of the notch with the pre-set lever is in correspondence to the size of the coin being rotated, means of engaging the indexing mechanism and segment for simultaneous rotation in the last mentioned direction, and adjustable means cooperating with the indexing mechanism for limiting movement of the segment by engagement with the index pawl of the pre-set lever.

7. In an automatic parking meter comprising a clock mechanism, a time scale, an indicator disc movable relative to the time scale, coin control means for moving the disc in one direction, accumulative indexing means responsive to the coin control means to provide selective periods of time by the signal for a plurality of variable sizes of multiple coins, a pair of spring urged pivotable bell cranks responsive to actuation of the coin control means and cooperating with each other to set one of the bell cranks in a predetermined selected position for limiting movement of the indexing means, and a plurality of adjustable discs cooperating with the indicator disc and each having an index leg of variable length and of angular disposition relative to the said one bell crank whereby one of the legs is adapted to cooperate with the said one bell crank lever in its predetermined position for limiting movement of the indexing means in accordance with the value of the coin utilized.

References Cited in the file of this patent

UNITED STATES PATENTS

| Number | Name | Date |
|---|---|---|
| 468,999 | Sawer | Feb. 16, 1892 |
| 1,186,578 | Holloway | June 13, 1916 |
| 1,418,770 | Woods | June 6, 1922 |
| 2,179,613 | Campbell | Nov. 14, 1939 |
| 2,213,240 | Clausen | Sept. 3, 1940 |
| 2,215,191 | Pudelko et al. | Sept. 17, 1940 |
| 2,256,398 | Lucia | Sept. 16, 1941 |
| 2,307,999 | Eldmann | Jan. 12, 1943 |
| 2,329,926 | Michaels | Sept. 21, 1943 |
| 2,333,994 | Eisenschmid | Nov. 9, 1943 |
| 2,394,554 | Kramer | Feb. 12, 1946 |
| 2,532,906 | Hale | Dec. 5, 1950 |
| 2,593,191 | Rockola | Apr. 15, 1952 |
| 2,625,250 | Hale | Jan. 13, 1953 |
| 2,680,506 | Woodruff | June 8, 1954 |
| 2,696,899 | Trier | Dec. 14, 1954 |
| 2,721,641 | Eames | Oct. 25, 1955 |